United States Patent

[11] 3,568,173

[72] Inventor Lance T. Klinger
Playa Del Rey, Calif.
[21] Appl. No. 753,541
[22] Filed Aug. 19, 1968
[45] Patented Mar. 2, 1971
[73] Assignee Scientific Data Systems, Inc.
Santa Monica, Calif.

[54] MEMORY STROAGE ELEMENT DRIVE CIRCUIT
10 Claims, 2 Drawing Figs.

[52] U.S. Cl. .................................................. 340/174, 307/254
[51] Int. Cl. .................................................. G11c 7/00, G11c 11/06, H03k 17/66
[50] Field of Search .................................................. 340/174 (M); 307/238, 253, 254

[56] References Cited

Publication I- IBM Technical Disclosure Bulletin Vol. 9. No. 7 Dec. 1966 pgs. 928— 929

*Primary Examiner*—James W. Moffitt
*Attorney*—Smyth, Roston and Pavitt

ABSTRACT: A memory core wire drive circuit is disclosed in which one wire end is normally biased to ground but controlled through a pair of transistors each connecting through series resistors to sources of opposite potentials. The other wire end connects through reversely biased diodes and two transistors directly to ground.

PATENTED MAR 2 1971

3,568,173

Figure 1:
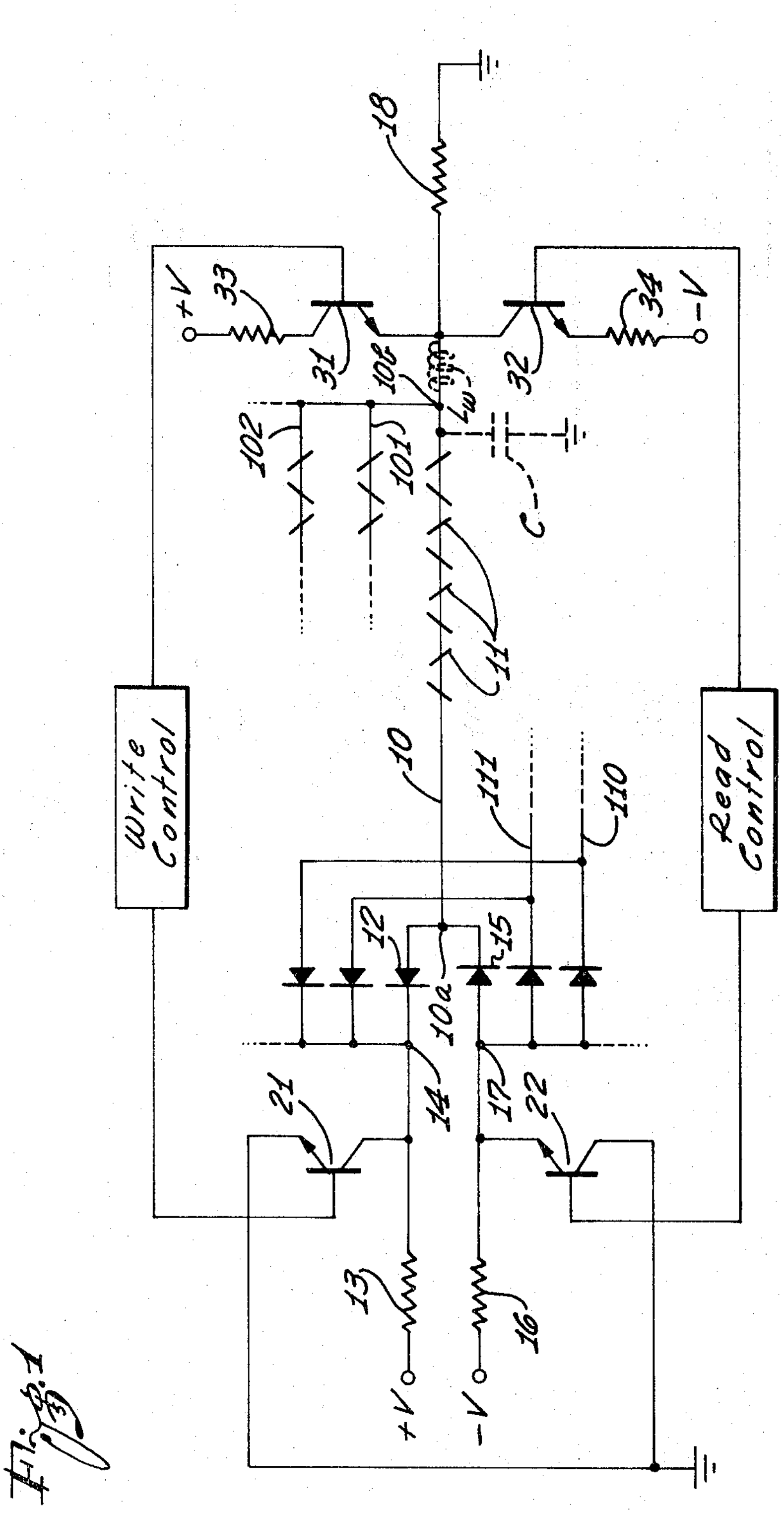

INVENTOR:
Lance T. Klinger
By Smyth, Roston & Pavitt
ATTORNEYS

MEMORY STROAGE ELEMENT DRIVE CIRCUIT

The present invention relates to memory element drive circuits, and more particularly to improvements in a circuit for controlling the flow of current through a circuit line such as wire to which memory storage elements, for example, magnetizable core elements are coupled for energization. The storage elements such as core elements pertain to a memory matrix, and a wire traverses a row or a column of the matrix. The two ends of each such wire are individually controlled as to electric potential and current flow through the wire; the current can flow therethrough in either one of two directions. The two different directions of current flow are respectively associated with memory read and write cycles which usually follow each other directly. Decoder diodes are connected in series with the wire at one end thereof. The diodes on unselected wires are normally biased in the reverse direction.

The control switches for one end of a wire control analogous ends of other wires of the matrix, while the control switches for the other end control analogous ends of still different wires of the matrix, but a pair of control elements for different wire ends always uniquely selects a particular wire for current flow therethrough in one particular direction, and to the exclusion of all other wires. The aforementioned decoder diodes prevent any wire not selected to serve as a return path for the current flow through the selected wire.

In conventional circuits of this type, problems have arisen if accidentally read and write cycles overlap; the switches on the same wire end may be closed concurrently producing a short circuit through the switches and between sources of different driving potential. Moreover, ringing was observed in the several branches of the circuit due to a parasitic capacitance between the several wires and ground coacting with the inductance of the backwiring, which extends between the switching circuit modules and the core memory modules. This ringing may enter the core memory readout circuit as noise. The known drive circuit requires also a special bias circuit for both wire ends to completely suppress, particularly when only one of the switches as connected to the wire is closed, due to a selection of a different wire. In this case means must be provided to prevent unequal potentials at both ends so that current does not flow through the nonselected wire.

The circuit in accordance with the present invention is constructed to have the switches as connected to one end of the wire and which preferably are connected in series with the decoder diodes, apply similar potential (for example, ground) to that one end of a core matrix wire, regardless which of these switches closes, while the other two switches at the other end of the wire each are connected in series with resistors leading to different sources of driving potential. That latter wire end is resistively permanently biased to the same potential as applied to the first-mentioned wire end through the switches as at that end of the wire when closed. The circuit eliminates the problems mentioned above and permits even overlapping of men memory read and write cycles, thus eliminating the need for a waiting period between the two cycles so that the total memory cycle is shortened.

The invention is explained with respect to core memory matrices but is applicable where storage elements of any design or construction are provided in a matrix array to be energized individually by signal coincidence, whereby one coincidence signal passes through a line to which are coupled several of such storage elements, for example, all of the elements of a row or of a column of the matrix. The invention specifically concerns the energization control of such a line independently from the type storage elements coupled thereto.

Figure 2:
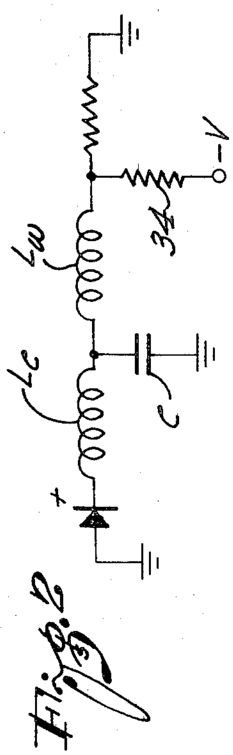

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates a circuit diagram for the preferred embodiment of the invention; and FIG. 2 is an equivalent circuit of a portion of the circuit shown in FIG. 1 for explaining the problem of ringing.

Proceeding now to the detailed description of the drawings, there is illustrated the drive system for a core matrix, array line 10 showing additionally how the particular system ties in with the control for other core matrix array lines of the same core memory system. Line 10 is provided, for example, as a thin wire threaded through ferrite cores 11 in the usual manner. The wire has, in the physical as well as in the symbolical sense, two ends, 10*a* and 10*b*, and the electric potentials of these points are controlled separately. The point 10*b* is connected to ground through a resistor 18. In the unenergized state, the entire wire 10 is thus essentially at ground potential. Other wires, such as 101, 102, etc. and pertaining likewise to the core matrix, connect to this end 10*b* which can thus be regarded as a junction.

The point 10*a* is connected through a first decoding diode 12 and a biasing resistor 13 to a source for a voltage potential +V relative to ground, while a parallel path leads from the point 10*a* through a second decoding diode 15 and a biasing series resistor 16 to a source for a voltage potential −V relative to ground. As one can see, the diodes 12 and 15 are connected to wire end 10*a* at such a polarity that they are respectively biased by the two sources +V and −V in the reverse to be nonconductive so that without further measures, current does not flow through the wire 10. The junction between diode 12 and resistor 13 is denoted with reference numeral 14, while the junction between diode 15 and resistor 16 is denoted with reference numeral 17. Other decoder diodes are connected to junctions 14 and 17 pertaining in pairs to other core matrix wires, such as 110, 111, etc.

In order to provide current flow through wire 10 in one or the other direction, the following control circuit is provided. A transistor 21 has its collector connected to junction 14 of resistor 13 and of the cathode of diode 12. The emitter of this transistor is connected ground. In a manner which can be regarded as complementary, a transistor 31 has its emitter connected to the point 10*b* and its collector is connected through a resistor 33 to the source for voltage +V. Transistors 21 and 31 are rendered conductive concurrently during a core memory write cycle involving one of the cores 11 on wire 10. For this case current flows from voltage source +V through resistor 33, transistor 31, wire 10, diode 12, transistor 21 to ground.

Current flow through wire 10 in the opposite direction is controlled through a transistor 22 connected with its emitter-collector path between the anode of diode 15 (junction 17) and ground. A second transistor 32 connects the point 10*b* to voltage source −V via a resistor 34. If, during a core memory read cycle, transistors 22 and 32 are rendered conductive, current flows through wire 10 but in the opposite direction as during the write cycle. In particular, during a read cycle involving one of the cores 11 on wire 10, current flows from ground through transistor 322, diode 15, wire 10, transistor 32, resistor 34 to voltage source −V.

The two transistors 21 and 22 are operated during different cycles or phases of a memory cycle, but they both connect to the same source of potential as driving voltage, to which the end 10*b* of the wire is connected permanently. Thus, the operating potentials applied to point 10*a* by transistor 21 or by transistor 22 when respectively conductive are equal among each other and equal to the biasing voltage applied to point 10*b* as long as one of the switches 31 and 32 is not energized. This is significant if transistor 21 or transistor 22 is rendered conductive for e reasons of controlling one of the other array wires (110 or 111, etc.) which are also controlled by transistors 21 and 22, while neither of the transistors 31 and 32 is rendered conductive. In this case, ground potential is applied to both ends 10*a*, 10*b* of wire 10 which thus remains currentless. Additionally, diode 12 or diode 15 prevents wire 10 to serve as return path. It is, therefore, not necessary to provide for additional bias of switches 21 and 22 for the case that only one of them, to the exclusion of switches 31 and 32, is rendered conductive for reasons of operating a wire other than 10. The circuit connection is made that as soon as any of the switches 21 or 22 is rendered conductive, for any reason, ground potential is applied to wire end 10*a* and the same potential is applied to the other end, unless switches 31 or 32 are rendered conductive.

The situation that one of the transistors 31 and 32 is conductive for energizing one of the wires 101 or 102, etc., while neither of the transistors 21 and 22 is conductive, does not pose any biasing problems. The potential of point 10*b* will drop to value between +V and −V, and the line 10 thus floats at that potential because diodes 12 and 15 remain back-biased.

The circuits connected to junctions 10*a*, 10*b* are to some extent symmetrical. One can readily see that in case any point of the circuit as connected to transistors 21 and 22, to diodes 12 and 15 at or near the end 10*b* of wire 10, or even wire 10 itself, is grounded for any reason, including accidents, no short circuit results. Any semiconductive circuit element as connected to the wire 10, and wire 10 itself can be grounded, as operating potential, is applied to any of these elements through resistors 13, 16, 33 and 34, and voltage sources of opposite polarity can interconnect only through two of such resistors in series, so that any semiconductor element can appear inserted in such series circuit path, but damage to such element will not result, because the resistors prevent short circuit current from flowing through the semiconductor element.

The two transistors 31 and 32, in particular, are connected respectively to the voltage sources +V and −V through series resistors 33 and 34. Thus, should transistors 31 and 32 be rendered conductive for any reason, such as an overlap of read and write control signals for the transistors, a short circuit does not result. More specifically, during a full memory cycle involving a core on wire 10, transistors 22 and 32 are rendered conductive concurrently for the read or clear phase or cycle of memory operation. Subsequently there will be a "-write" cycle or phase for which transistors 21 and 31 are rendered conductive concurrently.

Normally, write and read phases do not concur and do not have overlapping periods. However, for reasons of unequal transmission times of the control signals defining read and write phases for the transistors the control signals may overlap so that it may well occur that temporarily all transistors 21, 22, 31 and 32 are conductive concurrently. However, one can readily see that this does not cause any of the transistors to be damaged because there is no short circuit path. The +V and −V potential sources are connected through the resistors 33 and 34 to transistors 31 and 32 and neither source connects directly to ground or to each other through either of the two transistors. Concurrent conduction of transistors 21 and 22 opens only parallel paths to ground, and since resistors 33 and 34 are equal, ground potential prevails all along wire 10.

It follows from the foregoing that the sequence of read/write phases does not have to have large tolerance periods in between them. In the past, great care had to be taken to eliminate the possibility that under various circumstances and error situations, an overlap as between the enabling or triggering signals for transistors for opposite current flow through the wire could not possibly occur. Presently, no such tolerance is needed, so that the entire memory read/write cycle can be shortened, and even if an overlap occurs due to variations in the respective durations of read and write cycles, damage will not result.

The provision of resistors in the circuit path of the transistors which control the potential at that end of an array wire (10, 111, 110) which is not connected to the decoder diodes is a significant departure from conventional circuitry. It will be recalled that other core matrix wires are likewise connected to junction 10*b* and these other wires such as 101, 102, etc., have their respective other ends connected to different pairs of decode diodes, which are not connected to transistors

21 and 22. The connection of multiple wires to the point 10*b* produces a significant stray capacitance C between that particular junction 10*b* and ground (see FIG. 2).

Several apparent inductances are connected to this capacitance C and in various ways. There is the inductance $L_c$ of the various array wires which are connected to point 10*b* and there is inductance $L_w$ of the backwiring leading from junction 10*b* to transistor 31 or transistor 32, whichever is conductive. It has to be observed here that the core matrix wires and the several control transistors are usually mounted on different modules so that wires, printed circuit etchings, etc., of considerable length and, most importantly, with often extensive curved configuration, pass between switches matrix wires. The resulting inductance $L_w$ of such connection is connected in series with the respective resistors 33 and 34. However, that inductance together with capacitance C has little effect as a ringing LC circuit, particularly because point 10*b* is itself grounded through resistor 18, and as far as ringing transients is concerned, resistors 18 and 34 (or 33) are connected in parallel, because the inner impedance of the voltage source −V is very low as compared with resistors 34 and 18. Thus, resistors 33 and 34 together with resistor 18 a can readily be chosen to a periodically damp switching transients in the series LC circuit as composed of parasitic impedances $L_w$ and C. On the other hand, the array line inductance $L_c$ itself will tend to ring with the stray capacitance C, as $L_c$ and C form a parallel resonance circuit. This is actually the predominant ringing circuit. The resistors 33 and 34 are, therefore, selected to significantly damp ringing of this resonance circuit. In particular, if resistors 33 and 34 themselves are selected each to be sa smaller than ½ $\sqrt{L_c/C}$, aperiodic damping is certain, as the resistor 18 actually provides additional damping.

The invention is not limited to the embodiments described above, but all changes and modifications thereof not constituting departures from the spirit and scope of the invention are intended to be covered by the following claims.

I claim:

1. In a drive circuit for memory storage elements wherein:

a plurality of storage elements are coupled to a line and first and second unidirectional switching means are connected to a first end of the line, and third and fourth unidirectional switching means are connected to the second end of the line, and wherein decoder diodes are interposed in the connection of some of the switch means and the line, and wherein first and third switches close concurrently for a memory read cycle, the second and fourth switches close concurrently for a memory write cycle, for directly obtaining storage element operation on the line, the improvement comprising: a first source for a first potential, connected to the first and second switching means when individually operated in any of said types of cycles conductively connect the first source to said first end of the line for applying the same, first potential directly to said first end in either cycle;

first resistive means connected to the first source to permanently apply said first potential to the second end of the line;

a second source and a third source respectively for providing second and third potentials having opposite polarity relative to the first potential; and second and third resistive means respectively connected to the second and third sources and respectively connected in series with the third and fourth switch means, permanently separating the second end of the line from the second and third sources independently from the state of condition of each of the third and fourth switch means, so that the third and fourth switch means when operated during different cycles respectively apply the second and the third potential through the second and the third resistive means to the second end of the line.

2. A drive circuit as set forth in claim 1, there being a pair of decoder diodes respectively connected for conduction in opposite direction to the one end of the line and respectively in series with the first and second switching means.

3. A drive circuit as set forth in claim 1, the first and second switches being semiconductor devices having one main electrode each directly interconnected and connected to said first source of first potential.

4. A drive circuit as set forth in claim 1, the second and third resistive means each have dimension to damp ringing of the equivalent parallel LC circuit as effective at said other wire end, resulting from inductance of said line and of the capacitance thereof relative to said first potential.

5, A drive circuit as set forth in claim 1, the first and second switching means when closed providing a short circuit path between the first source of potential to the one end of the line leading respectively through one of the diodes.

6. A drive circuit as set forth in claim 1, the first potential being ground, the second and third potentials being oppositely equal.

7. A drive circuit as set forth in claim 6, the diodes being connected to be resistively biased for nonconduction through said second and third potentials.

8. In a memory element drive circuit:

a circuit line having a plurality of storage elements for operative coupling thereto;

a pair of switches directly connected to one end of the line;

a pair of resistors respectively connected in series to the switches without shunt path across;

a pair of voltage potential sources respectively connected to the ends of the respective series circuit of the resistors and the switches not connected to said one end of the line;

a pair of decoder diodes connected to the other end of the line at opposite directions of conduction;

switch means in series with the decoder diodes for applying potential different from the potentials of the sources through the decoder diodes to the other end of the line; and bias means permanently applying the different potential to the one end of the line.

9. In a memory element drive circuit; a circuit line having a plurality of storage element switches for operative coupling thereto, the line having first end and second end, there being a first resistor means connected to the first end, there being a source of first potential connected to the resistor, so that the first potential of the source is applied via the resistor to the first end as permanent bias, there being sources of second and third potentials, respectively more positive and more negative than the first potential, the combination comprising:

first and second unidirectional switching means connected in parallel to each other between the second end of the line and the source of first potential to provide current paths for different directions of current flow through the line and as between the second end and the source of first potential;

third and fourth unidirectional switching means, the third switching means connected between the source of second potential and the first end of the line, the fourth switching means connected between the source of third potential and the first end of the line, the first and third switching means, when concurrently conductive, causing current to flow from the second source of potential through the line to the source of first potential, to obtain first particular switching operation in the storage element switches in direct response to initiation of s current flow as a direct result of concurrent conduction of the first and third switching means, the second and fourth switching means, when concurrently conductive, causing current to flow from the source of first potential through the line to the source of third potential, to obtain second particular switching operation different from the first particular switching operation in the storage elements switches in direct response to initiation of current flow as a direct result of concurrent conduction of the second and fourth switching means; and second and third resistor means respectively connected in series with the third and fourth switching means, as respectively connected between the second and third sources of potential on one hand and the first end of the line on the other hand, to be passed through by each of the current flows throughout their respective period of flow as respectively defined by concurring conduction of the first and third switching means and by concurring conduction of the second and fourth switching means.

10. A drive circuit as in claim 9, the second and third resistance means each have dimensions to damp ringing of the equivalent LC circuit as effective at said first line end resulting from inductance of said line and of the capacitance thereof relative to the source of said first potential.